(12) United States Patent  (10) Patent No.: US 7,783,785 B2
Zolnowsky et al.  (45) Date of Patent: Aug. 24, 2010

(54) METHOD AND APPARATUS FOR BIOS DETERMINATION OF NETWORK INFORMATION AND DIAGNOSTICS

(75) Inventors: Jeffrey D. Zolnowsky, Vermillion, SD (US); David M. Hawkinson, La Mirada, CA (US)

(73) Assignee: Gateway, Inc., N. Sioux City, SD (US)

( * ) Notice: Subject to any disclaimer, the term of this patent is extended or adjusted under 35 U.S.C. 154(b) by 1349 days.

(21) Appl. No.: 10/954,710

(22) Filed: Sep. 30, 2004

(65) Prior Publication Data

US 2006/0069906 A1  Mar. 30, 2006

Related U.S. Application Data

(60) Provisional application No. 60/508,201, filed on Oct. 2, 2003.

(51) Int. Cl.
 *G06F 15/16* (2006.01)
(52) U.S. Cl. .................................................. 709/250
(58) Field of Classification Search .................. 709/250
 See application file for complete search history.

(56) References Cited

U.S. PATENT DOCUMENTS

| | | | | |
|---|---|---|---|---|
| 5,841,991 | A * | 11/1998 | Russell | 709/221 |
| 6,353,854 | B1 * | 3/2002 | Cromer et al. | 709/224 |
| 6,397,287 | B1 * | 5/2002 | Brown et al. | 710/305 |
| 6,711,526 | B2 * | 3/2004 | Cooper | 702/186 |
| 6,910,068 | B2 * | 6/2005 | Zintel et al. | 709/220 |
| 7,080,244 | B2 * | 7/2006 | Natu et al. | 713/1 |
| 7,200,745 | B2 * | 4/2007 | Schwartz et al. | 713/1 |
| 7,219,140 | B2 * | 5/2007 | Marl et al. | 709/219 |
| 7,246,111 | B1 * | 7/2007 | Chaware et al. | 707/3 |
| 2002/0108002 | A1 * | 8/2002 | Gifford et al. | 710/36 |
| 2003/0120827 | A1 * | 6/2003 | Fulginiti et al. | 709/319 |
| 2003/0191854 | A1 * | 10/2003 | Hsu et al. | 709/250 |
| 2003/0195995 | A1 * | 10/2003 | Tabbara | 709/313 |
| 2003/0200273 | A1 * | 10/2003 | Khanna et al. | 709/208 |
| 2003/0221093 | A1 * | 11/2003 | Touchet | 713/1 |
| 2004/0024840 | A1 * | 2/2004 | Levine et al. | 709/217 |
| 2004/0078682 | A1 * | 4/2004 | Huang | 714/37 |
| 2004/0102917 | A1 * | 5/2004 | Chen et al. | 702/120 |
| 2004/0128531 | A1 * | 7/2004 | Rotholtz | 713/200 |
| 2004/0151116 | A1 * | 8/2004 | Sultenfuss et al. | 370/232 |
| 2004/0153539 | A1 * | 8/2004 | Lyon et al. | 709/224 |
| 2004/0225875 | A1 * | 11/2004 | Huang et al. | 713/1 |
| 2005/0038981 | A1 * | 2/2005 | Connor et al. | 713/1 |
| 2005/0039081 | A1 * | 2/2005 | Chang et al. | 714/36 |

\* cited by examiner

*Primary Examiner*—Benjamin R Bruckart
(74) *Attorney, Agent, or Firm*—Thomas, Kayden, Horstemeyer & Risley

(57) ABSTRACT

A computer with a network controller has suitable programming for determining the address of the network controller by means of the computer BIOS. Suitable instructions can be provided to obtain the MAC address of an ETHERNET-based system or the UUID of a 1394-based network controller. The BIOS is optionally programmed to obtain information about other characteristics of the network controller and perform diagnostics related to the network controller.

11 Claims, 1 Drawing Sheet

METHOD AND APPARATUS FOR BIOS DETERMINATION OF NETWORK INFORMATION AND DIAGNOSTICS

REFERENCE TO RELATED APPLICATION

This application claims the benefit of U.S. Provisional Patent Application No. 60/508,201, filed Oct. 2, 2003.

FIELD OF THE INVENTION

This invention relates to computer systems and, more particularly, to methods and apparatus for determining computer network information and performing computer network diagnostics.

BACKGROUND OF THE INVENTION

Computers are often linked into networks to communicate with each other. Such networks may take on any number of forms and may be based on a number of different standards or protocols, ranging from peer-to-peer connections, hubs, LANs, WANs, the world-wide web, intranet, internet, and the like. Networking can be accomplished by any number of cable connections, whether copper or fiber, as well as wireless networks and so-called "Wi-Fi".

A necessary component of any networking scenario is for the user's computing device, whether it be a cell phone, PDA, laptop, desktop, or server, to have an "address" or "location" on the appropriate network. It is likewise generally important for servers, routers, and switches to be appropriately configured to maintain adequate and hopefully optimal traffic flow of data across the various network connections. Maintaining security of network communications and associated privacy is also a factor to consider in establishing and creating networks.

In view of the various considerations in networking computers and establishing the associated networks for such computers, it is important for end users, network managers, IT professionals, and the like to be able to network computers and maintain such network in as straightforward a manner as possible. For example, in setting up a network of computers or adding a computer to an existing network, it is often necessary to know the address of a network interface card ("NIC"), also referred to as a network controller. For ETHERNET networks, this address is often referred to as the Media Access Control ("MAC") address, whereas for 1394-type networks this address is often referred to as the UUID (Universal Unique ID). When configuring "upstream" components from the computer to be networked, such as servers, routers, hubs, and the like, knowing the different addresses of the computers to be networked facilitates network maintenance and updating, and is often necessary or helpful in assigning different ports to different network interface cards (or controllers). It is likewise helpful to both end users and IT professionals to determine additional network controller information, such as link activity and current line speed, as well as to perform simple link diagnostics related to the computers' connections to the appropriate network(s).

There are various drawback and disadvantages to determining the network addresses of computers to be networked and other useful information and diagnostics for network connections. For example, determining MAC addresses or UUIDs often requires access to a label or other indicia physically affixed to the network card or controller itself. This presents a particular problem when the network controller is inside a computer already.

Another approach is to obtain network controller information or perform diagnostics by means of the operating system. This requires disadvantageous time and effort to be spent in configuring or imaging the PC to be networked and booting it up completely just to obtain network address information for adding to the associated network.

It is thus often desirable to determine network controller information, network information, and perform associated diagnostics without recourse to an operating system or other "application-level" software.

SUMMARY OF THE INVENTION

According to one aspect of the invention, a computer includes instructions in non-volatile memory which, when executed, obtain the network address of a network controller of the computer and displays such address. In one version of the invention, the instructions are part of the BIOS of the computer stored on an EEPROM. The BIOS includes suitable programming to obtain the MAC address in an ETHERNET-based environment and the UUID in a 1394-based environment.

The present invention likewise includes a method of adding a computer to a network. The address of the network controller is read by the computer by executing computer instructions stored in non-volatile memory prior to installation of the operating system on the computer. Once the address has been read, it is associated with a port on the network. A software image is then applied to the computer through the associated port, thereby adding the computer to the network.

The objects and features of the invention will be better understood by reference to the detailed description which follows, taken together with the drawings in which like elements are referred to by like designations throughout.

DETAILED DESCRIPTION

Figure 1:
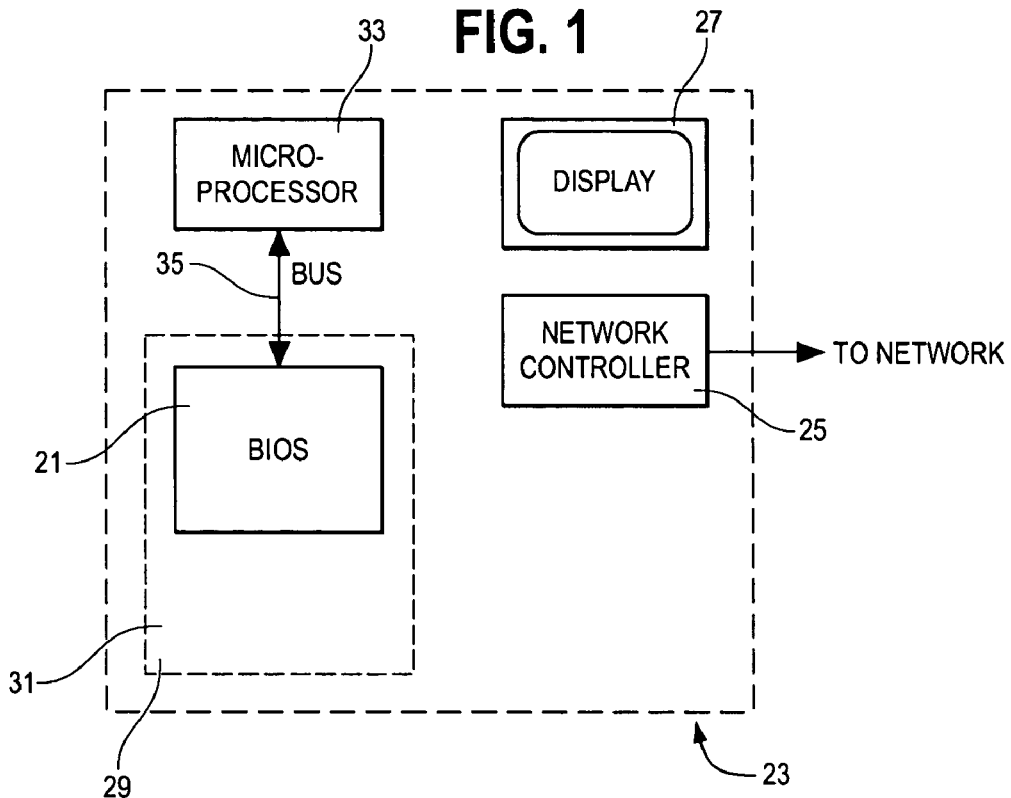
FIG. 1 is a schematic representation showing an apparatus and associated method for determination of network information and performance of network diagnostics, according to the present invention.

Referring now to FIG. 1, in one preferred embodiment of the present invention, network information is determined and certain network diagnostics are performed by means of instructions, subroutines, or other suitable programming coded as part of the BIOS 21 of an associated computer 23. For example, BIOS 21 is preferably provided with instructions to determine the address of the network controller or the network card 25. (It is understood that the terms network controller and network card are used interchangeably to mean the physical or logical device for establishing a communication link between an associated computer and a network or other computer.)

Figure 2:
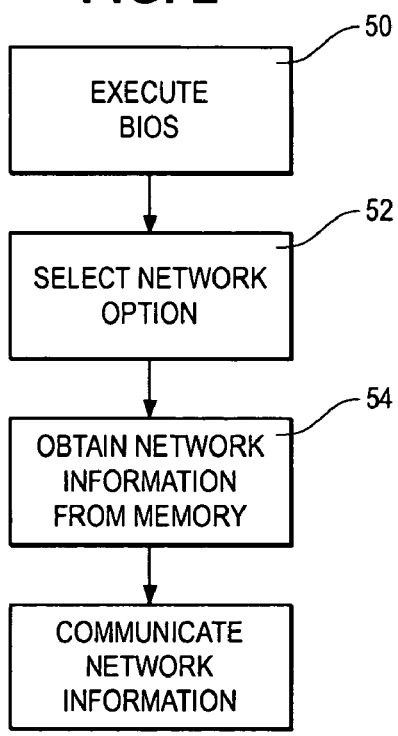
FIG. 2 is a flowchart illustrating a method according to the present invention.

Thus, as shown by the flowchart of FIG. 2, a user, IT professional, or other individual can call up the BIOS 21 (step 50), choose the option or command to obtain network information such as the network address (step 52), find out the network information or address associated with the particular computer (step 54), and use such information to connect such computer to a network or for other purposes for which the network address is useful (step 56).

Preferably, the instructions to obtain and display the network address can be executed from any one of the menus or display screens associated with the BIOS or, alternately, by hitting a tab or other key on the computer's keyboard to display such address. For example, the BIOS 21 could be operable to display hardware configuration information, and the network address could be displayed as part of such screen. Similarly, BIOS 21 operates in various modes, such as set-up mode, and the network address could be displayed during such set-up mode.

Referring again to FIG. 1, the BIOS 21 coded with instructions according to the present invention is generally found in non-volatile memory 31, such as an EEPROM 29, which has been suitably programmed. From such non-volatile memory location, the BIOS 21 is able to send instructions to the computer microprocessor 33 over any suitable bus 35, such as the so-called X bus, an adjunct to the Industry Standard Association (ISA) bus, a suitable secondary bus, the PCI (peripheral component interface) bus, and the like. The address of the network controller 25 is stored at an accessible memory location generally know to the art, such as in an EEPROM of the network controller 25. Other memory locations, whether non-volatile or volatile, are likewise useful to the instructions and network address, and other computer busses are suitable to obtain the network information according to the present invention.

Figure 3:
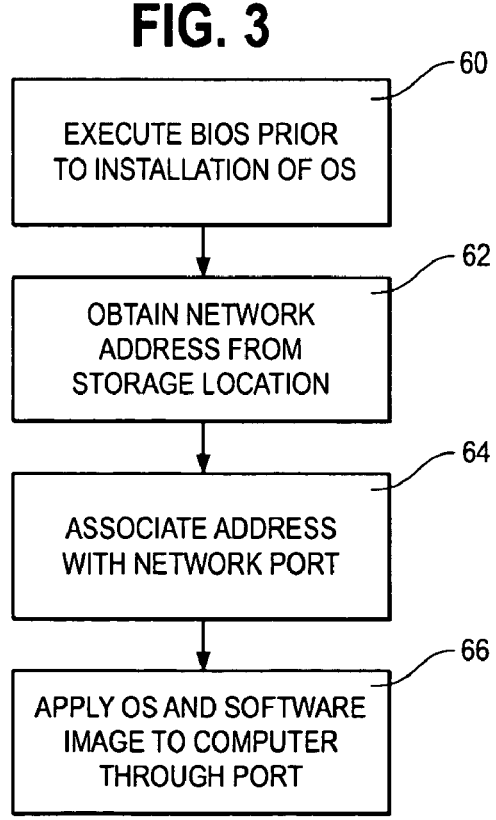
FIG. 3 is a flowchart illustrating another method according to the present invention.

Preferably, the instructions to obtain and display the network address are executed by the computer without needing a full-scale startup of the computer's operating system. Thus, as shown by the flowchart of FIG. 3, an IT professional or other appropriate personnel is able to add a computer to a network or set up a network with computers prior to installation of the operating system on the computer(s) (step 60). The address of the network controller is read from its storage location by the instructions described above (step 62). After obtaining such address, it is either displayed on the computer for further use or alternately communicated to another program for further use, such as in network maintenance or updating. Preferably the address is associated with a suitable port of the network, such as would be present on a switch, router, or the like (step 64). Once the port and the network address have been associated with each other, the IT professional or other person can complete the computer's installation on the network by applying to such computer a software image or download to such computer (step 66). Oftentimes, the IT professional can create a common "software image" for multiple computers and push such image down to the computers after they have been appropriately associated with corresponding ports on the switch, router, and the like.

The present invention is suitable for use with any network environment making use of addresses for the computers of such networks, including LANs, WANs, the worldwide web, internet, intranet, peer-to-peer connections, hubs, and the like. Preferably, the BIOS 21 of the present invention includes suitable programming to read the so-called media access control ("MAC") address from an appropriate storage location in an ETHERNET-based network. Similarly, for 1394-type networks, BIOS 21 includes suitable programming to obtain and display the UUID (universal unique ID).

The network address is just one of many possible characteristics of network controller 25 which BIOS 21 of the present invention can obtain and display. In particular, BIOS 21 can include instructions for obtaining information about multiple characteristics of network controller 25 and displaying indicia corresponding to such characteristics. Network characteristics preferably include line status and the current line speed.

Furthermore, network diagnostic routines can be included in suitable programming of BIOS 21, so that performance characteristics of network controller 25 can be evaluated preferably without recourse to the operating system or other higher-level software applications. In particular, a suitable diagnostic can be coded to perform a UPD echo link test to determine this characteristic of network controller 25.

The program instructions of the present invention are preferably associated with a personal computer, but are likewise suitable for other networked computing devices, including cell phones, PDAs, servers, and the like.

While illustrated and described above with reference to certain specific embodiments, the present invention is nevertheless not intended to be limited to the details shown. Rather, various modifications may be made in the details within the scope and range of equivalents of the description and without departing from the spirit of the invention.

What is claimed is:

1. A computer having
a display, a network controller comprising a network interface card, a microprocessor, and a non-volatile memory, the network interface card having a physical hardware address, the non-volatile memory comprising a basic input/output system (BIOS) that executes instructions for the computer to obtain the physical hardware address of the network interface card and display indicia corresponding to the physical hardware address of the network interface card prior to an installation of an operating system on the computer,
wherein the network interface card comprises characteristics including link status and the line speed of the network; and the non-volatile memory further comprises additional instructions for displaying indicia corresponding to the link status and the line speed of the network.

2. The computer of claim 1, wherein the non-volatile memory comprises an electronically erasable programmable read only memory (EEPROM).

3. The computer of claim 2, wherein the BIOS is operable to display hardware configuration information, and wherein the instructions to obtain the physical hardware address include instructions to display the physical hardware address of the network interface card in conjunction with the hardware configuration information.

4. The computer of claim 2, wherein the BIOS is operable in a set-up mode, and wherein the instructions for obtaining and displaying the physical hardware address are executable by the BIOS during the set-up mode.

5. The computer of claim 1, wherein the non-volatile memory comprises an EEPROM programmed with the BIOS for the computer, and the additional instructions comprise a LAN option operable by the BIOS.

6. The computer of claim 1, wherein the network controller has a plurality of characteristics, and the non-volatile memory further comprises diagnostics for the characteristics.

7. The computer of claim 6, wherein the diagnostics comprise a UPD echo link test.

8. A method of obtaining information about a network controller of a computer, the method comprising the following steps:
- providing a basic input/output system (BIOS) with instructions for the computer to obtain the information; electronically executing the instructions by the BIOS to obtain the information of the network controller, the network controller comprising a network interface card and the information comprising a physical hardware address of the network interface card;
- providing the instructions in the BIOS to determine link speed and line speed of the network controller; and
- displaying the information prior to an installation of an operating system on the computer.

9. The method of claim 8, wherein the network controller further comprises an ETHERNET controller with a MAC address, and wherein the step of executing the instructions includes reading the MAC address of the ETHERNET controller.

10. The method of claim 8, wherein the physical hardware address comprises a universal unique identification (UUID), and wherein the step of executing the instructions includes reading the UUID of the controller.

11. The method of claim 8, further including the steps of providing the BIOS with at least one network diagnostic and executing the diagnostic to obtain the information about the network interface card.

* * * * *